(12) United States Patent
Dams

(10) Patent No.: US 7,307,409 B2
(45) Date of Patent: Dec. 11, 2007

(54) TRANSPORTABLE MEASURING PROBE, MEASURING SYSTEM, PROCESS FOR DETERMINING MEASUREMENT VALUES, AND USE OF THE MEASURING SYSTEM

(75) Inventor: Francis Dams, Leuven (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 28 days.

(21) Appl. No.: 11/179,108

(22) Filed: Jul. 12, 2005

(65) Prior Publication Data

US 2006/0012380 A1    Jan. 19, 2006

(30) Foreign Application Priority Data

Jul. 13, 2004    (DE)    ............ 10 2004 034 031

(51) Int. Cl.
*G01N 27/00* (2006.01)
*G01S 1/00* (2006.01)
*G01C 21/00* (2006.01)

(52) U.S. Cl. ............... 324/71.1; 342/357.09; 701/207

(58) Field of Classification Search ............ 324/71.1, 324/690, 72.5, 149, 437, 445, 446, 715, 724; 701/207; 702/130; 340/870.17; 455/404.2, 455/457, 456.1; 342/357.06, 357.08, 357.09, 342/357.01
See application file for complete search history.

(56) References Cited

U.S. PATENT DOCUMENTS

| | | | | |
|---|---|---|---|---|
| 3,832,781 A | * | 9/1974 | Flagge | .............. 33/23.01 |
| 3,893,341 A | * | 7/1975 | Acres | .............. 374/16 |
| 5,319,576 A | | 6/1994 | Iannadrea | |
| 5,609,485 A | * | 3/1997 | Bergman et al. | ......... 434/262 |
| 5,815,114 A | | 9/1998 | Speasl et al. | |
| 5,886,775 A | * | 3/1999 | Houser et al. | ............. 356/4.01 |
| 6,451,186 B1 | | 9/2002 | Verstreken | |
| 6,459,989 B1 | * | 10/2002 | Kirkpatrick et al. | ......... 701/215 |
| 6,560,354 B1 | * | 5/2003 | Maurer et al. | .............. 382/131 |
| 6,985,743 B2 | * | 1/2006 | Bajikar | .............. 455/456.1 |
| 6,998,978 B2 | * | 2/2006 | Kirkeby | .............. 340/539.12 |
| 7,054,651 B2 | * | 5/2006 | Ocke | ....................... 455/456.3 |
| 7,085,693 B2 | * | 8/2006 | Zimmerman | ............ 703/6 |
| 7,194,354 B1 | * | 3/2007 | Oran et al. | ................. 701/207 |
| 7,203,458 B1 | * | 4/2007 | Cheng | ..................... 455/67.11 |

(Continued)

FOREIGN PATENT DOCUMENTS

DE    198 48 229 A1    6/1999

(Continued)

OTHER PUBLICATIONS

Brännström, R., "Indoor Polishing System", *Bachelor's Thesis*, Lulea University of Technology, ISSN: 1404-5494, pp. 3-19 (2001).

(Continued)

*Primary Examiner*—Vincent Q. Nguyen
*Assistant Examiner*—Hoai-An D. Nguyen
(74) *Attorney, Agent, or Firm*—Akin Gump Strauss Hauer & Feld LLP

(57) ABSTRACT

A transportable measuring probe is provided having a transmitting and receiving module for wireless transmission of information, wherein the transmitting and receiving module is suitable for detection and transmission of positional data of the measuring probe to an evaluation device.

6 Claims, 1 Drawing Sheet

U.S. PATENT DOCUMENTS

| | | | |
|---|---|---|---|
| 2005/0099322 A1* | 5/2005 | Wainfan et al. | 340/995.13 |
| 2005/0288856 A1* | 12/2005 | Uyeki et al. | 701/210 |
| 2007/0073483 A1* | 3/2007 | Tzidon | 701/301 |
| 2007/0143006 A1* | 6/2007 | Plettner | 701/207 |

FOREIGN PATENT DOCUMENTS

| | | |
|---|---|---|
| DE | 100 13 392 A1 | 10/2000 |
| DE | 100 52 941 A1 | 5/2002 |
| GB | 2369962 A | 6/2002 |
| JP | 7 143551 A1 | 6/1995 |
| JP | 10-90017 A | 4/1998 |
| JP | 11 206721 A | 8/1999 |
| JP | 2000-028438 | 1/2000 |

OTHER PUBLICATIONS

Fryer, G., et al., "Reduction Cell Control Technology", *Light Metal*, The Minerals, Metals & Materials Society, pp. 331-339 (1998).

* cited by examiner

TRANSPORTABLE MEASURING PROBE, MEASURING SYSTEM, PROCESS FOR DETERMINING MEASUREMENT VALUES, AND USE OF THE MEASURING SYSTEM

BACKGROUND OF THE INVENTION

The invention relates to a transportable measuring probe, a measuring system, a process for determining measurement values, and also a use of the measuring system.

Transportable measuring probes are known from the prior art for various application purposes. For example, in U.S. Pat. No. 6,451,186 B1, a measuring probe is disclosed for measuring temperatures in cryolite melts. Such measuring probes have a sensor and also signal lines, which are connected to evaluation electronics by a cable. In this way, these probes are transportable to a limited extent and can be used at different measurement locations.

From G. G. Fryer et al., "Reduction Cell Control Technology," *Light Metal*, pp. 331-339, The Minerals, Metals & Materials Society, Barry Welch ed. (1998), it is known to arrange stationary transmitters on melting furnaces in aluminum factories for transmitting radio signals to operators equipped with so-called pagers. Here, alarm information is transmitted if limit values are exceeded. Essential data are delivered from the individual furnaces to a control center. Devices for wireless transmission of measurement signals obtained in molten steel are known from Japanese published patent application JP 2000-028438 A and from U.S. Pat. No. 5,319,576 A.

From Lulea University Technology, an indoor positioning system is known (ISSN 1404-5494), with whose help very precise determination of positions within buildings is possible. This system is an expansion of GPS, which does not function in enclosed buildings without additional means. The adaptation of a GPS system for use in indoor spaces is described in U.S. Pat. No. 5,815,114 A.

BRIEF SUMMARY OF THE INVENTION

The problem of the present invention is to improve the known measuring probes in order to transmit measurement results in a simple way independent of cable lengths.

The problem is solved according to the invention in which a transportable measuring probe comprises a transmitting and receiving module for wireless transmission of information, and the transmitting and receiving module is suitable for detecting and transmitting positional data of the measuring probe to an evaluation device. Because the measuring probe has a transmitting and receiving module for wireless transmission of information within buildings or enclosed spaces, with the transmitting and receiving module being suitable for detecting and for transmitting positional data of the measuring probe to an evaluation device, especially by an indoor positioning system, the measuring probe itself can be kept very lightweight. Moreover, cables that would impair the mobility of the operator with the measuring probe are unnecessary, and in principle the operation of one measuring probe is sufficient for measuring an arbitrary number of measurement locations, so that only a single measuring system is needed.

The evaluation device can be stationed in a central location, so that the measurement data are received and processed in a control center and are used there for controlling the measured surroundings, for example in melting furnaces in aluminum factories. Through the combination of positional measurement and transmission with a property measurement and transmission, the property measuring values can always be allocated specifically and exactly to a certain position, e.g., to a certain melting furnace or to the measured medium. Here, it can be advantageous to form the transmitting and receiving modules from separate units, respectively for the transmission and reception of data. Here, the positional data are received and retransmitted wirelessly, and the property data are likewise retransmitted wirelessly, wherein the different data can be retransmitted by different transmitting units. Structural integration of the transmitting and receiving units is also possible.

It is advantageous if the measuring probe has a sensor for detecting temperature and/or chemical constituents, preferably of a molten metal or a cryolite melt, and if the transmitting and receiving module is suitable for transmitting the measurement parameters characterizing the temperature and/or chemical constituents to the evaluation device. Thus, melting processes in steel factories or especially in aluminum factories can be advantageously detected and evaluated. The measuring system according to the invention has, in addition to the measuring probe according to the invention, an evaluation device, wherein the evaluation device has a receiver for wireless reception of information. The further information guidance can take place by infrared or ultrasonic waves. Transmission by radio waves, so-called WLAN, by Bluetooth technology, is also possible, wherein various techniques can also be combined with each other.

The process according to the invention for detecting measurement data of a transportable measuring probe by an evaluation device is characterized in that the measuring probe detects by a sensor its spatial position and also wirelessly transmits to an evaluation device measurement data and also the position at the time of detecting the measurement data via a sensor.

The detection of the measurement data and the position do not absolutely have to take place simultaneously, even a position detection shortly before or shortly after measurement value detection is possible, because as a rule all that is important is that the measuring values can be allocated to a certain location, for example a melting furnace of an aluminum factory. Here, it is advantageous that the spatial position be detected by a transmitting and receiving module, to which the data corresponding to the spatial position of the measuring probe are likewise transmitted wirelessly.

According to the invention, it is advantageous that the measuring probe detect its spatial position and also measurement data successively at various locations and that the measurement and positional data be respectively transmitted to the evaluation device. In particular, the process can be advantageously performed for detecting measurement data, especially the temperature or chemical constituents in a metal or cryolite melt.

Thus, the measuring probe according to the invention can be used especially for measuring temperature and/or chemical constituents of metal or cryolite melt, especially for successive measurements in different melting containers.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
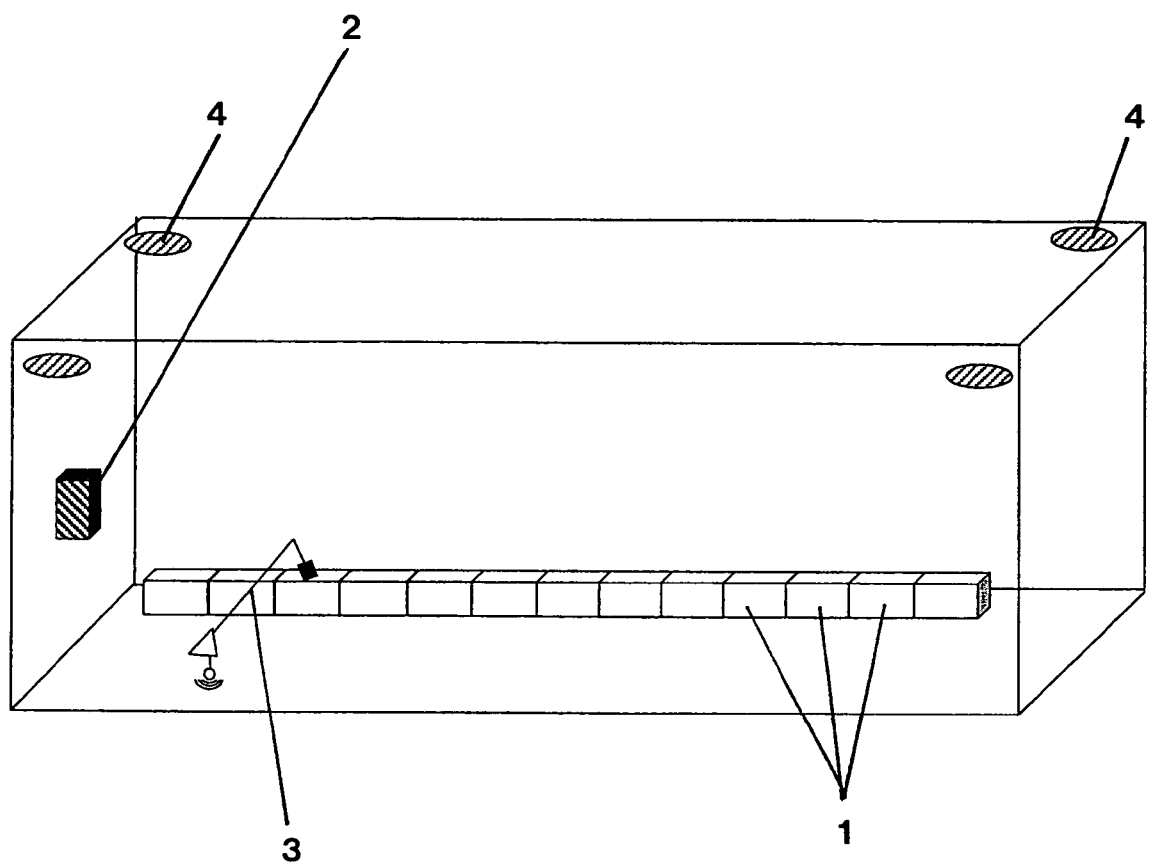
FIG. 1 is a schematic representation of a hall of an aluminum factory with a plurality of successive electrolytic tanks 1.

FIG. 1 shows a schematic representation of a hall of an aluminum factory with a plurality of successive electrolytic tanks 1. During the process, for example, the bath temperature or the concentration of constituents of the aluminum melt is measured and the measurement signals are retransmitted to a control center 2 with an evaluation device for the transmitted data. Because the series of electrolytic tanks can be longer than 100 m, it is not possible to use a cable-bound measuring probe 3 without additional means, so that previously either one stationary measuring probe was allocated to each tank 1 or one cable-bound measuring probe was used for measurements in several tanks. However, here a complicated allocation of the individual measuring signals to a certain tank is necessary.

A wireless data transmission, connected with the simultaneous transmission of the position of the measuring probe 3, permits unambiguous allocation. For this purpose, the measuring probe 3 contains a transmitter/receiver for detecting and retransmitting the location data, which were obtained with the help of an indoor positioning system 4 ("IPS") and which are retransmitted to the control center 2 and are there compared with the stored positional data of the tanks 1. The measuring probe 3 further contains a transmitter for transmitting the measurement signals obtained from the melt to the control center, in which the data are evaluated. Therefore, each tank 1 can be controlled individually in a simple manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A measurement system for making successive measurements on molten metal or molten cryolite contained in a plurality of melting furnaces, the plurality of melting furnaces being located at a plurality of locations within an indoor space, said system comprising:
 a transportable measuring probe configured to wirelessly transmit: (1) the measurements and (2) positional data representative of the position of the probe at the time of each molten metal measurement;
 an evaluation device configured to receive the measurements and the positional data transmitted by the transportable measurement probe; and
 an indoor positioning system configured to wirelessly provide positioning signals to the measurement probe, the indoor positioning system being disposed at location unrelated to the plurality of locations of the plurality of melting furnaces.

2. The measurement system of claim 1, wherein the measuring probe includes a wireless transmitting and receiving module for detecting the positional signals and for transmitting the molten metal measurements and the positional data.

3. The measuring probe according to claim 2, further comprising a sensor for making the measurements, said sensor detecting at least one of temperature and a chemical constituent of the molten metal and the molten cryolite, wherein the transmitting and receiving module is suitable for transmitting parameters characterizing the temperature and/or the chemical constituent to the evaluation device (2).

4. The measuring probe according to claim 2, wherein the transmitting and receiving module comprises separate units for transmission and for reception of the positional data.

5. The measuring probe according to claim 2, wherein separate units are provided for transmission of the positional data and the parameters characterizing the temperature and/or chemical constituents.

6. The measurement system of claim 1, wherein the measurements and the positional data are combined by the evaluation device such that the measurements are allocated to the molten metal or molten cryolite of which the molten measurements are taken.

* * * * *